United States Patent
Fatemi et al.

(10) Patent No.: US 12,541,014 B2
(45) Date of Patent: Feb. 3, 2026

(54) SYSTEMS AND METHODS FOR SYNTHETIC APERTURE FOCUSING IN ULTRASOUND IMAGING

(71) Applicant: Mayo Foundation for Medical Education and Research, Rochester, MN (US)

(72) Inventors: Mostafa Fatemi, Rochester, MN (US); Bae H. Kim, London (GB); Azra Alizad, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 287 days.

(21) Appl. No.: 17/427,822

(22) PCT Filed: Feb. 3, 2020

(86) PCT No.: PCT/US2020/016416
§ 371 (c)(1),
(2) Date: Aug. 2, 2021

(87) PCT Pub. No.: WO2020/160546
PCT Pub. Date: Aug. 6, 2020

(65) Prior Publication Data
US 2022/0128675 A1 Apr. 28, 2022

Related U.S. Application Data

(60) Provisional application No. 62/800,306, filed on Feb. 1, 2019.

(51) Int. Cl.
*G01S 7/52* (2006.01)
*A61B 8/00* (2006.01)
(Continued)

(52) U.S. Cl.
CPC ............ *G01S 7/52047* (2013.01); *A61B 8/14* (2013.01); *A61B 8/5269* (2013.01); *A61B 8/54* (2013.01);
(Continued)

(58) Field of Classification Search
CPC ............ G01S 7/52047; G01S 15/8915; G01S 15/8997; G01S 15/8995; A61B 8/14; A61B 8/5269; A61B 8/54
See application file for complete search history.

(56) References Cited

U.S. PATENT DOCUMENTS 6,736,780 B2   5/2004  Song et al.
2003/0229285 A1 * 12/2003 Simpson ................ A61B 8/481
                                                              600/458

(Continued)

OTHER PUBLICATIONS

Andresen, H.S., et al., "Three-Dimensional Synthetic Aperture Focusing Using a Rocking Convex Array Transducer" IEEE Transactions on Ultrasonics, Ferroelectrics and Frequency Control (2010) 57(5), 1051-1063.

(Continued)

*Primary Examiner* — Jonathan Cwern
(74) *Attorney, Agent, or Firm* — Quarles & Brady LLP

(57) ABSTRACT

Systems and methods are provided for suppressing the side-lobe artifacts in ultrasound imaging with plane wave compounding. The use of discrete angles in transmitting plane waves may be used to suppress side-lobes and the resulting side-lobe artifacts without increasing the number of firings required. A method is provided that utilizes nulls in Rx beam pattern to suppress side-lobes based on the beam pattern formula. An apodization technique that uses window functions according to Tx angles and/or Rx aperture may also be used. A method using aperiodic sampling angles may also be used to suppress artifacts. Application to arbitrary interval sampling angles may be found. Suppressing arti- (Continued)

facts according to the present disclosure may provide for wider field of view imaging without resorting to increasing the number of firings required (NFR).

21 Claims, 10 Drawing Sheets

(51) Int. Cl.
    *A61B 8/14*     (2006.01)
    *G01S 15/89*     (2006.01)

(52) U.S. Cl.
    CPC ...... *G01S 15/8915* (2013.01); *G01S 15/8997* (2013.01)

(56) References Cited

U.S. PATENT DOCUMENTS

| | | | | |
|---|---|---|---|---|
| 2009/0326379 | A1* | 12/2009 | Daigle | A61B 8/06 600/453 |
| 2015/0320396 | A1* | 11/2015 | Abe | G01S 7/52077 600/443 |
| 2016/0266252 | A1* | 9/2016 | Ramamurthy | G01S 15/8997 |
| 2018/0017669 | A1* | 1/2018 | Lee | A61B 8/4405 |

OTHER PUBLICATIONS

Austeng, A., et al., "Simple Weighting to Enhance Sparse Periodic Arrays" International Conference on Acoustics, Speech, and Signal Processing (2000) Proceedings vol. 5, pp. 3109-3112.

Bae, M.H., et al., "A study of synthetic-aperture imaging with virtual source elements in B-mode ultrasound imaging systems," IEEE Trans. Ultrason., Ferroelectr. Freq. Control (2000) vol. 47, No. 6, pp. 1510-1519.

Chang, J.H., et al., "A new synthetic aperture focusing method to suppress the diffraction of ultrasound," IEEE Trans. Ultrason. Ferroelectr. Freq. Control (2011) vol. 58, No. 2, pp. 327-337.

Denarie, B., et al., "Coherent plane wave compounding for very high frame rate ultrasonography of rapidly moving targets," IEEE Trans. Med. Imaging (2013) vol. 32, No. 7, pp. 1265-1276.

Gong, P., et al., "Ultrafast Synthetic Transmit Aperture Imaging Using Hadamard-Encoded Virtual Sources With Overlapping Sub-Apertures," IEEE Trans. Med. Imaging (2017) vol. 36, No. 6, pp. 1372-1381.

Gong, P., et al., "Delay-encoded Harmonic Imaging (DE-HI) in Multiplane-wave Compounding," IEEE Trans. Med. Imaging (2017) vol. 36, No. 4, pp. 952-959.

Guo, W., et al., "A Sibelobe Suppressing Beamformer for Coherent Plane Wave Compounding" Applied Sciences (2016) vol. 6, pp. 359.

Hansen, J.M., et al., "Compounding in synthetic aperture imaging," IEEE Trans. Ultrason., Ferroelectr. Freq. Control (2012) vol. 59, No. 9, pp. 2054-2065.

International Search Report and Written Opinion and issued for PCT/US2020/016416 dated Jun. 9, 2020.

International Preliminary Report on Patentability issued for PCT/US2020/016416 dated Jul. 27, 2021.

Jensen, J., et al., "Increased frame rate for plane wave imaging without loss of image quality" Proc. IEEE Ultrason. Symp., (2015) pp. 1-4.

Jensen, J., et al., "Optimized plane wave imaging for fast and high-quality ultrasound imaging," IEEE Trans. Ultrason., Ferroelect., Freq. Control (2016) vol. 63, No. 11, pp. 1922-1934.

Jeong, M.K., et al., "Generation of sinc wave by a one dimensional array for applications in ultrasonic imaging," IEEE Trans. Ultrason. Ferroelectr. Freq. Control (1996) vol. 43, No. 2, pp. 258-295.

Karaman, M., et al., "Synthetic aperture imaging for small scale systems," IEEE Trans. Ultrason. Ferroelectr. Freq. Control (1995) vol. 42, No. 3, pp. 429-442.

Kim, B.H., et al., "A study of synthetic aperture focusing using plane waves to provide wider field of view ultrasound imaging without side-lobe artifacts due to the use of sampling angle in transmitting inclined plane waves" IEEE Unternational Ultrasonics Symposium (2017) p. 1.

Lockwood, G.R., et al., "Realtime 3-D ultrasound imaging using sparse synthetic aperture beamforming," IEEE Trans. Ultrason. Ferroelectr. Freq. Control (1998) vol. 45, No. 4, pp. 980-988.

Montaldo, G., et al., "Coherent plane-wave compounding for very high frame rate ultrasonography and transient elastography," IEEE Trans. Ultrason., Ferroelectr. Freq. Control (2009) vol. 56, No. 3, pp. 489-506.

Morse, P.M., et al.,"Methods of Theoretical Physics" Part I. New York McGtaw-Hill, Chapter 4, pp. 348-491.

Morse, P.M., et al.,"Methods of Theoretical Physics" Part I. New York McGtaw-Hill, Chapter 7, pp. 791-895.

Rodriguez-Molares, A., et al., "The angular apodization in coherent plane-wave compounding," IEEE Trans. Ultrason., Ferroelect., Freq. Control (2015) vol. 62, No. 11, pp. 2018-2023.

Rodriguez-Molares, A., et al., "Axial lobes in coherent plane-wave compounding," in Proc. IEEE Ultrasonics Symp. (2016).

Tanter, M., et al., "Ultrafast compound imaging for 2-D motion vector estimation: Application to transient elastography," IEEE Trans. Ultrason., Ferroelectr. Freq. Control (2002) vol. 49, No. 10, pp. 1363-1374.

* cited by examiner

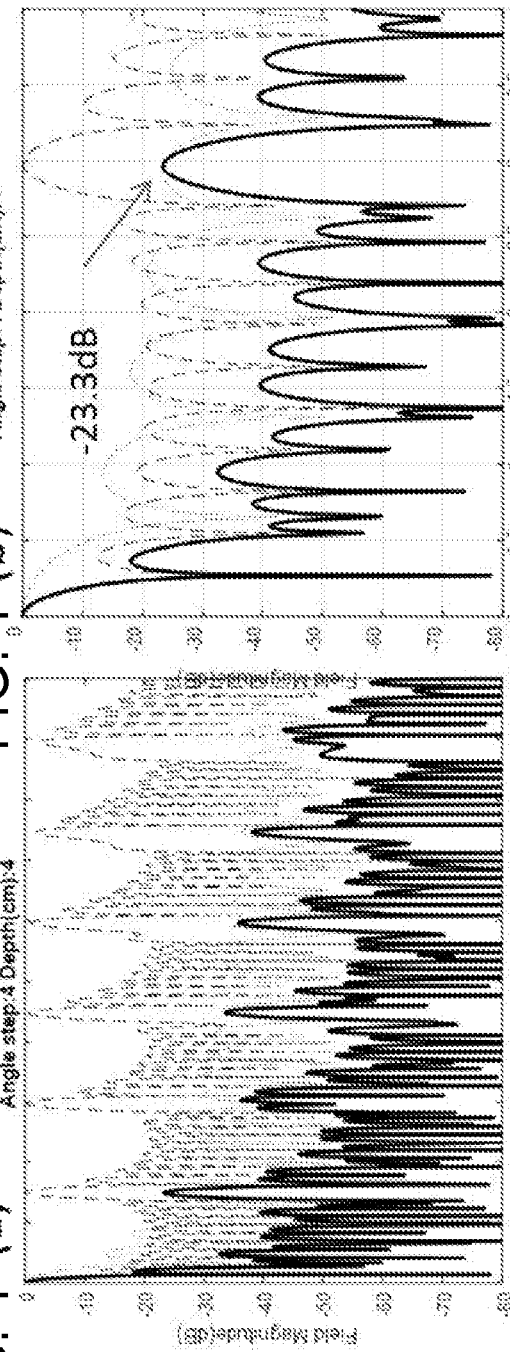
FIG. 4 (a)
FIG. 4 (b)
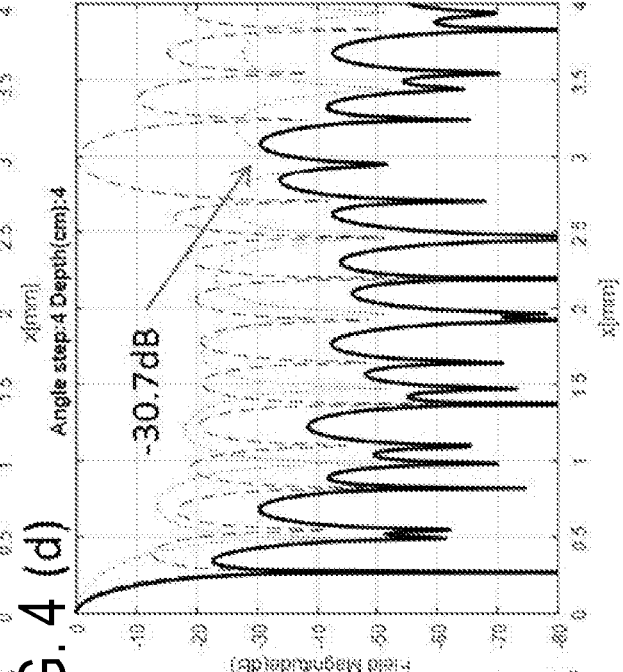
FIG. 4 (c)
FIG. 4 (d)
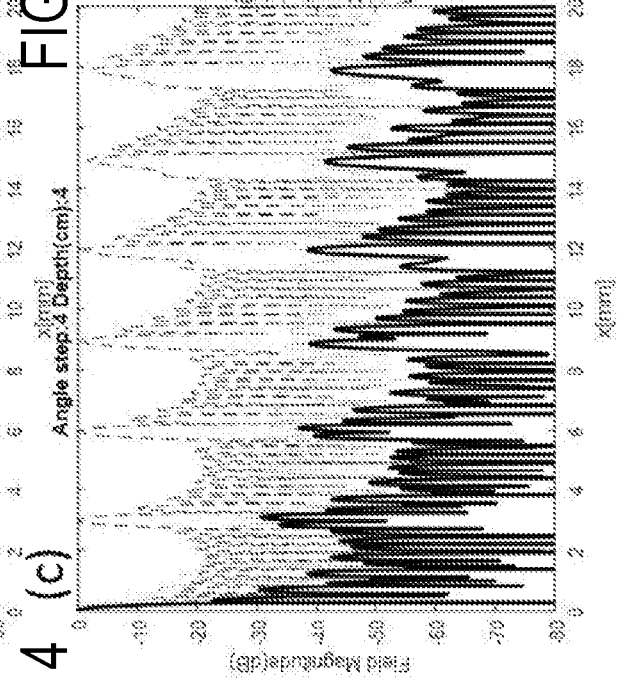

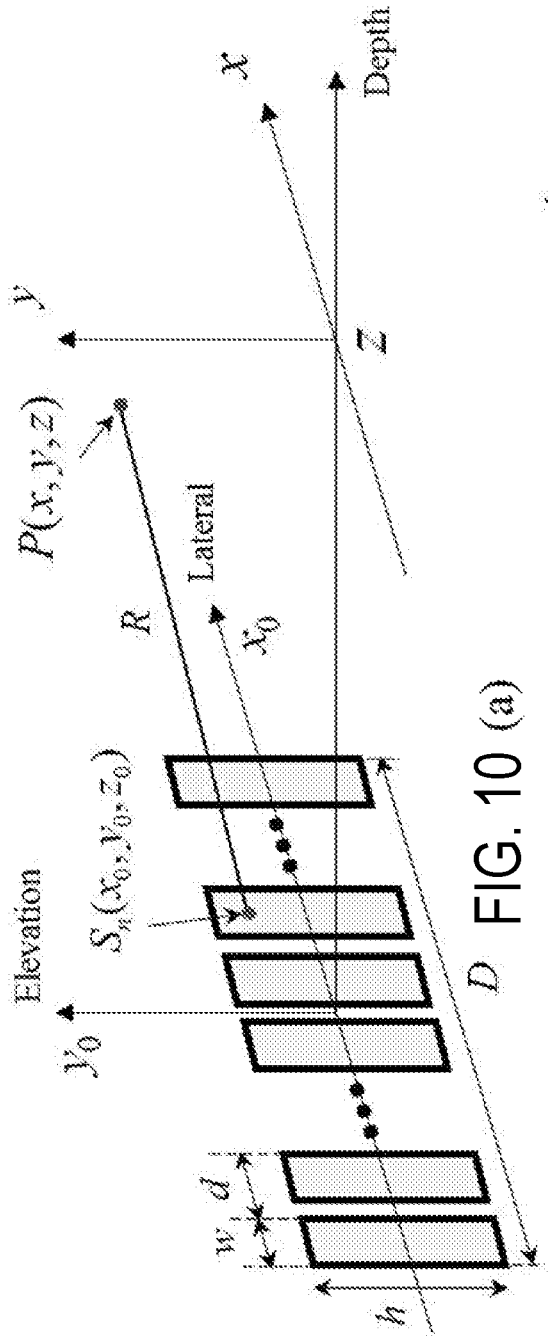
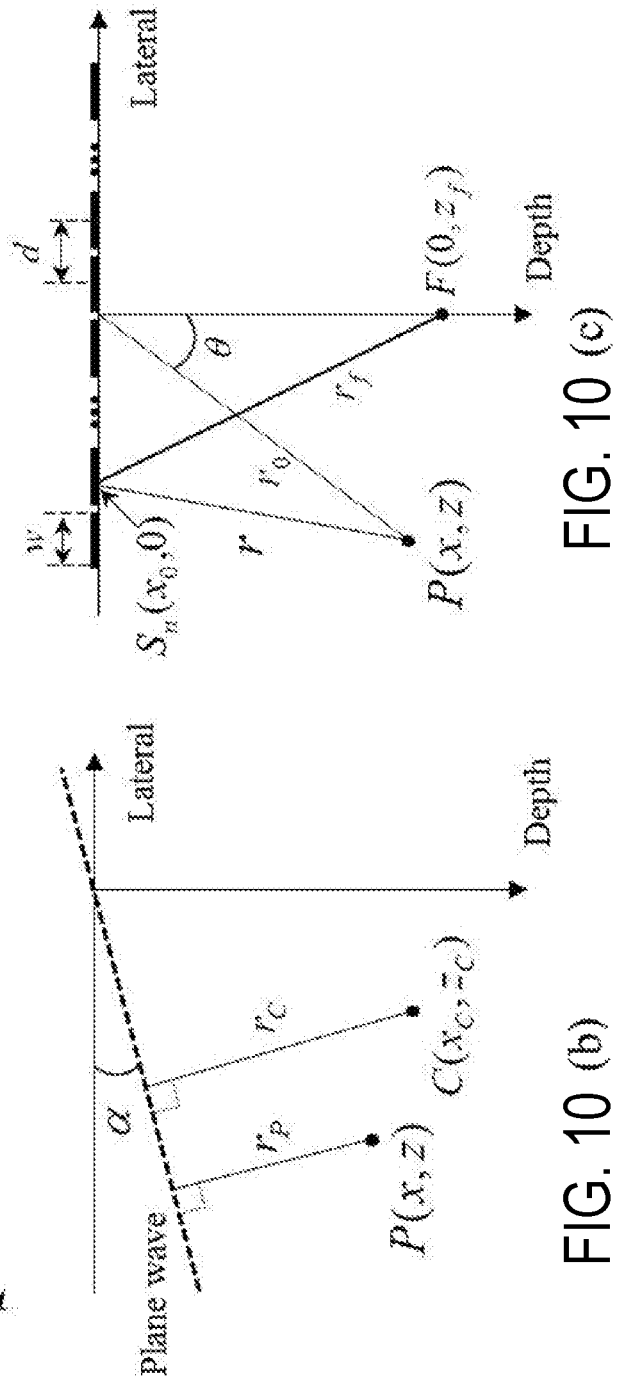
FIG. 10 (a)
FIG. 10 (b)
FIG. 10 (c)

SYSTEMS AND METHODS FOR SYNTHETIC APERTURE FOCUSING IN ULTRASOUND IMAGING

CROSS-REFERENCE TO RELATED APPLICATIONS

This application represents the national stage entry of PCT/US2020/016416 filed on Feb. 3, 2020 and claims the benefit of U.S. Provisional Patent Application Ser. No. 62/800,306, filed on Feb. 1, 2019, and entitled "SYSTEMS AND METHODS FOR SYNTHETIC APERTURE FOCUSING IN ULTRASOUND IMAGING," which is herein incorporated by reference in its entirety.

STATEMENT REGARDING FEDERALLY SPONSORED RESEARCH

This invention was made with government support under CA148994, EB017213, CA168575, DK099231, CA174723, and CA195527 awarded by the National Institutes of Health. The government has certain rights in the invention.

BACKGROUND

Synthetic transmit aperture focusing technique, which is also called retrospective transmit dynamic focusing technique, has been developed in diagnostic ultrasound imaging systems to realize two-way dynamic focused fields. The superposition of plane waves traveling at different angles provides a sinc wave that has approximately limited diffraction field response in a lateral direction in a finite region. Synthetic transmit aperture focusing based on planar waves known as coherent plane wave compounding (CPWC) was also introduced to improve synthetic transmit aperture focusing technique using spherical wave-front by reducing the diffraction spreading effect of ultrasound at depths. CPWC has been widely used in shear wave elasticity imaging (SWEI) due to its capability of ultrafast frame rate. Synthetic transmit aperture focusing technique based on unfocused (plane waves) or defocused transmit (Tx) beams is still being investigated to achieve improved spatial resolution imaging of high frame rate without suffering from low SNR by combining with coded excitation or coding technique.

Angular apodization in PWC to compare array apodization in synthetic transmit aperture imaging (STAI) has been previously proposed, including the use of λ/2 pitch in PWC and Tx apodization in an array to reduce original grating lobe artifacts due to use of A pitch for transmitting steering waves. However CPWC based on plane wave transmission still has an inherent limitation in imaging wider fields of view (FOV) compared to the aperture width or in increasing the frame rate without a compromise in lateral resolution due to the use of sampling angle in transmitting steered ultrasound waves. The sampling angle causes an unwanted side-lobe artifact if the sampling interval angle is not small enough to cancel the artifact. Image artifacts result from increased side-lobes due to the use of discrete angles in transmitting plane waves.

There remains a need to control the side-lobes in ultrasound imaging in order to suppress the side-lobe artifacts.

SUMMARY OF THE DISCLOSURE

The present disclosure addresses the aforementioned drawbacks by providing systems and methods for suppressing the side-lobe artifacts in ultrasound plane wave compounding. In some configurations, the use of discrete angles in transmitting plane waves may be used to suppress side-lobes and the resulting side-lobe artifacts without increasing the number of firings required. In one configuration, a method is provided that utilizes nulls in Rx beam pattern to suppress side-lobes based on the beam pattern formula. In one configuration, an apodization technique that uses window functions according to Tx angles and/or Receive (Rx) aperture may be used. In one configuration, aperiodic sampling angles method may be used. In some configurations, application to arbitrary interval sampling angles may be found.

In one configuration, a method is provided for image artifact suppression in ultrasound imaging. The method includes transmitting an ultrasound beam to a subject and determining an ultrasound transmission beam pattern from the transmitted beam. The method also includes receiving an ultrasound beam from the subject and determining a received ultrasound beam pattern. Suppressing image artifacts may be performed by positioning at least one null of the received ultrasound beam pattern at a location of at least one peak of the transmission beam pattern.

In another configuration, a method is provided for image artifact suppression in ultrasound imaging. The method includes determining an aperiodic sampling angle interval and determining a transmission delay profile for channels of an ultrasound transducer based upon a first steering angle. The method also includes transmitting ultrasound to a subject using the transmission delay profile and receiving an ultrasound signal from the subject. Suppressing image artifacts may be performed by updating the transmission delay profile with a second steering angle based upon the aperiodic sampling angle interval and transmitting ultrasound to the subject The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTION OF THE DRAWINGS

FIG. 4A provides a non-limiting example graph of beam patterns according to FIG. 2 using an F-number of 3.1.

FIG. 4B provides a zoomed-in view of the non-limiting example graph of FIG. 4A.

FIG. 4C provides a non-limiting example graph of beam patterns according to FIG. 2 using an F-number of 2.39.

FIG. 4D provides a zoomed-in view of the non-limiting example graph of FIG. 4C.

FIG. 10A depicts an example configuration of a diffraction geometry in 3D space for spatial distribution function of source aperture S and field point P.

FIG. 10B provides an example plane wave transmission beam-pattern geometry in 2D space according to FIG. 10A.

FIG. 10C provides an example of receiver dynamic focusing according to FIG. 10A.

DETAILED DESCRIPTION

Systems and methods are provided for suppressing the side-lobe artifacts in ultrasound imaging with plane wave compounding. In some configurations, the use of discrete angles in transmitting plane waves may be used to suppress side-lobes and the resulting side-lobe artifacts without increasing the number of firings required. In one configuration, a method is provided that utilizes nulls in Rx beam pattern to suppress side-lobes based on the beam pattern formula. In another configuration, an apodization technique that uses window functions according to Tx angles and/or Rx aperture may be used. In still other configurations, aperiodic sampling angles method may be used. In some configurations, application to arbitrary interval sampling angles may be found. In some configurations of the present disclosure, coherent plane wave compounding (CPWC) may be used to improve the spatial resolution and to control the side-lobe artifacts due to using discrete angles in transmitting inclined plane waves. Methods are also provided to suppress these artifacts to provide a wider FOV imaging without resorting to increasing the number of firings required (NFR).

As inclined plane waves utilized for coherent compounding are transmitted with discrete angles, the transmission beam pattern resulting from synthesizing the plane waves using the steered angles inherently has the unwanted artifacts in spaces that are similar to the grating lobe artifacts due to using the inter-spacing array elements. This phenomenon can be analyzed as the aliasing resulting from discrete samples of angles in a continuous angle domain that may be the same as the sampling theorem.

Figure 1:
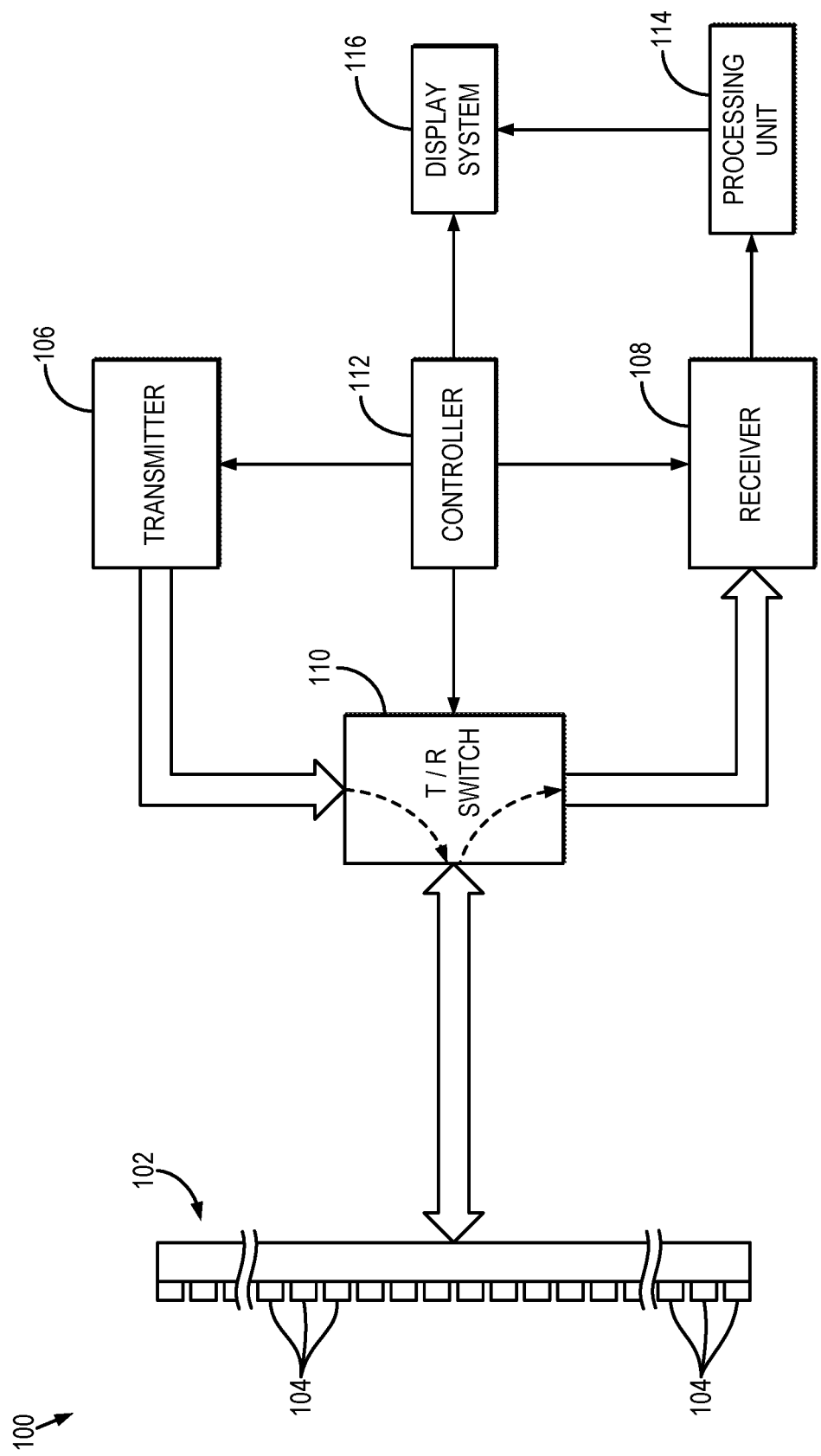
FIG. 1 provides one configuration of an ultrasound system that can be used to implement an embodiment of the systems and methods described in the present disclosure.

FIG. 1 illustrates an example of an ultrasound system 100 that can implement the methods described in the present disclosure. The ultrasound system 100 includes a transducer array 102 that includes a plurality of separately driven transducer elements 104. The transducer array 102 can include any suitable ultrasound transducer array, including linear arrays, curved arrays, phased arrays, and so on. Similarly, the transducer array 102 can include a 1D transducer, a 1.5D transducer, a 1.75D transducer, a 2D transducer, a 3D transducer, and so on.

When energized by a transmitter 106, a given transducer element 104 produces a burst of ultrasonic energy. The ultrasonic energy reflected back to the transducer array 102 (e.g., an echo) from the object or subject under study is converted to an electrical signal (e.g., an echo signal) by each transducer element 104 and can be applied separately to a receiver 108 through a set of switches 110. The transmitter 106, receiver 108, and switches 110 are operated under the control of a controller 112, which may include one or more processors. As one example, the controller 112 can include a computer system.

The transmitter 106 can be programmed to transmit unfocused or focused ultrasound waves. In some configurations, the transmitter 106 can also be programmed to transmit diverged waves, spherical waves, cylindrical waves, plane waves, or combinations thereof. Furthermore, the transmitter 106 can be programmed to transmit spatially or temporally encoded pulses.

The receiver 108 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 106 and the receiver 108 can be programmed to implement a high frame rate. For instance, a frame rate associated with an acquisition pulse repetition frequency ("PRF") of at least 100 Hz can be implemented. In some configurations, the ultrasound system 100 can sample and store at least one hundred ensembles of echo signals in the temporal direction.

The controller 112 can be programmed to design an imaging sequence using the techniques described in the present disclosure, or as otherwise known in the art. In some embodiments, the controller 112 receives user inputs defining various factors used in the design of the imaging sequence.

A scan can be performed by setting the switches 110 to their transmit position, thereby directing the transmitter 106 to be turned on momentarily to energize transducer elements 104 during a single transmission event according to the designed imaging sequence. The switches 110 can then be set to their receive position and the subsequent echo signals produced by the transducer elements 104 in response to one or more detected echoes are measured and applied to the receiver 108. The separate echo signals from the transducer elements 104 can be combined in the receiver 108 to produce a single echo signal.

The echo signals are communicated to a processing unit 114, which may be implemented by a hardware processor and memory, to process echo signals or images generated from echo signals. As an example, the processing unit 114 can generate a reduced artifact image based upon side-lobe suppression using the methods described in the present disclosure. Images produced from the echo signals by the processing unit 114 can be displayed on a display system 116.

In some configurations, to cancel the side-lobe artifact due to the use of discrete angles, the sampling interval of u is selected to be sufficiently small as $U_s \leq 2\lambda/W$ at a given imaging width of FOV ($-W/2 \leq x \leq W/2$). In such configurations, NFR may need to be increased. The aim is to increase the frame rate without suffering from the side-lobe artifacts due to the sampling interval of angle in plane wave transmission. Wider FOVs without sacrificing the temporal resolution may also be provided. In some configurations, suppressing the grating lobe artifact due to the sampled array source with an inter-element space of elements arranged in the x-direction can also be adopted.

Figure 2:
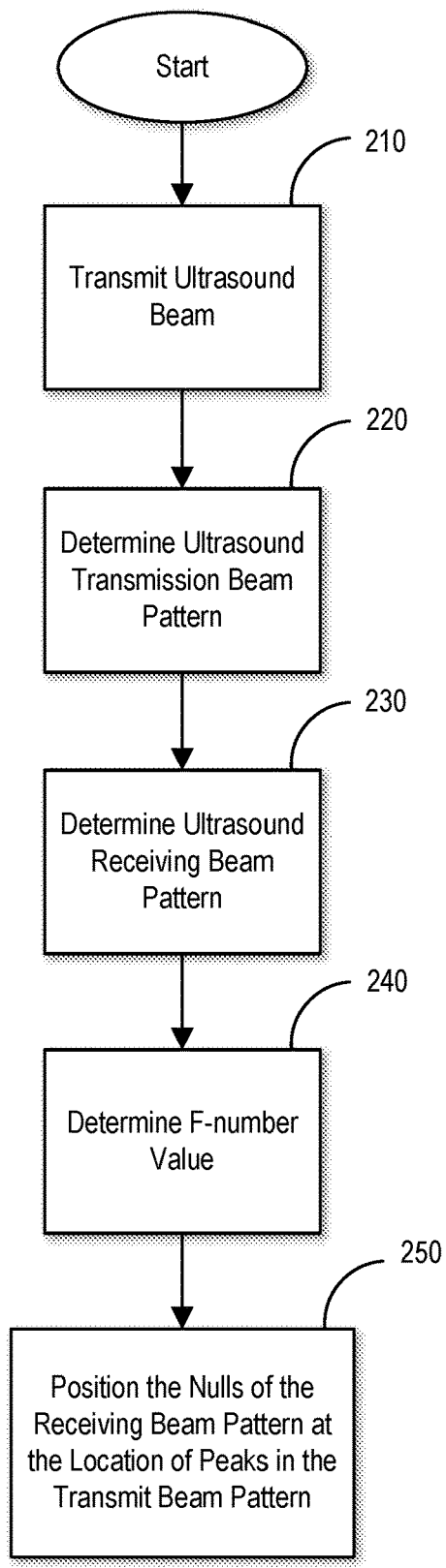
FIG. 2 depicts a non-limiting example flow chart for suppressing side-lobe artifacts utilizing nulls of a received beam pattern.

Referring to FIG. 2, a non-limiting example flow chart is provided for suppressing side-lobe artifacts due to the sampling angle interval utilizing nulls of the Rx beam pattern. An ultrasound beam is transmitted to a target, such as a tissue of a subject, at step 210 and an ultrasound transmission beam pattern is measured, determined, or selected at step 220. A receiving beam pattern is determined at step 230 based upon the ultrasound pattern received. An F-number may be calculated at step 240, such as described below. The nulls, or low amplitude points, of the receiving waveform beam pattern are then adjusted to be positioned at the location of the peak amplitudes of the transmission beam waveform pattern at step 250.

In some configurations, the repetitive peaks of the sinc patterns in the lateral direction may be selected to be on the nulls of the Rx beam pattern:

$$\frac{l\lambda}{U_s} = \frac{m\lambda r_0}{dN_R} (l, m = 1, 2, \dots ).\quad(1)$$

With this, the F-number that makes the nulls of Rx beam pattern to suppress the side-lobe artifacts may be given by $$F_{num} = \frac{l}{mU_S} \approx \frac{l}{m\Delta\alpha} (l, m = 1, 2, \dots );\quad(2)$$

where $U_s$ is the sampling period (or interval) of u, which is a real number, $\Delta\alpha$ represents the sampling interval angle, and l and m are integers.

Figure 3:
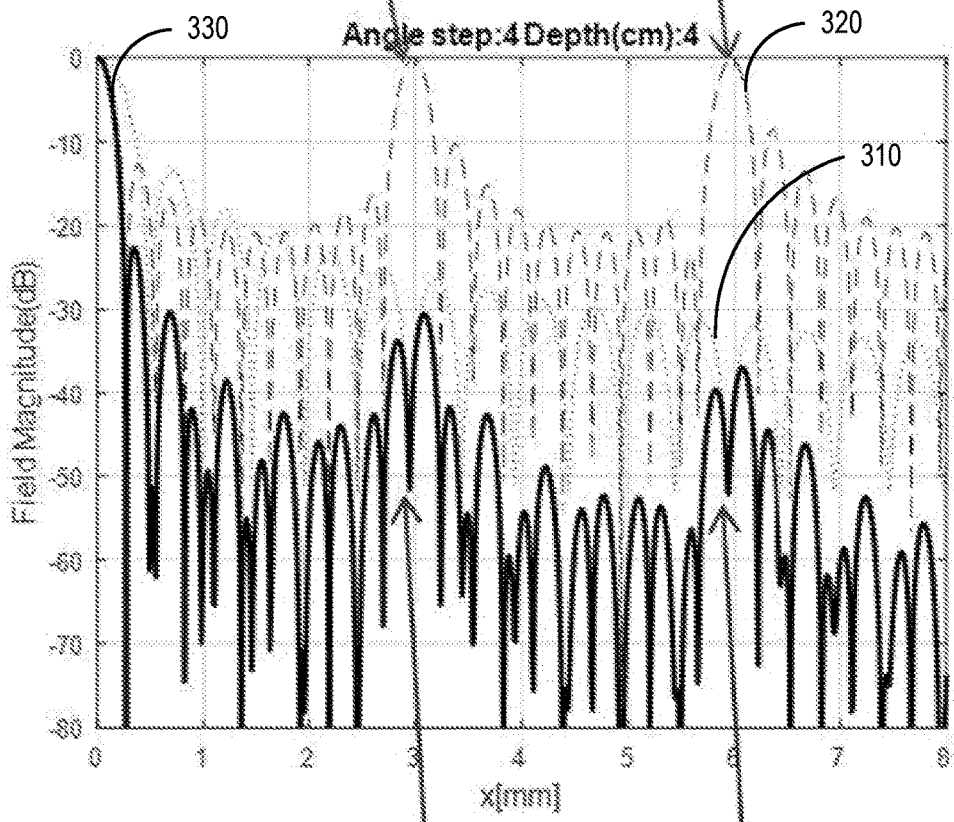
FIG. 3 provides a non-limiting example graph of how the nulls of a receiver beam pattern may be positioned at the location of the peaks of a transmit beam pattern in accordance with one configuration of the present disclosure.

Referring to FIG. 3, a non-limiting example is shown for how the nulls of a receiver beam pattern 310 may be positioned at the location of the peaks of a transmit beam pattern 320. The resulting example final beam pattern 330 is also shown.

Referring to FIGS. 4A-D, non-limiting examples are shown where the sampling interval angle $\Delta\alpha$ is 4 degrees, and $F_{num}$ may be selected to be 2.39 for l=1 and m=6 to suppress the side-lobes. The use of the above $F_{num}$ formula suppresses the side-lobe levels in the lateral beam-pattern. The final beam patterns in FIG. 4C and FIG. 4D using F-number of 2.39 show lower side-lobes than FIG. 4A and FIG. 4B using F-number of 3.1.

Figure 5:
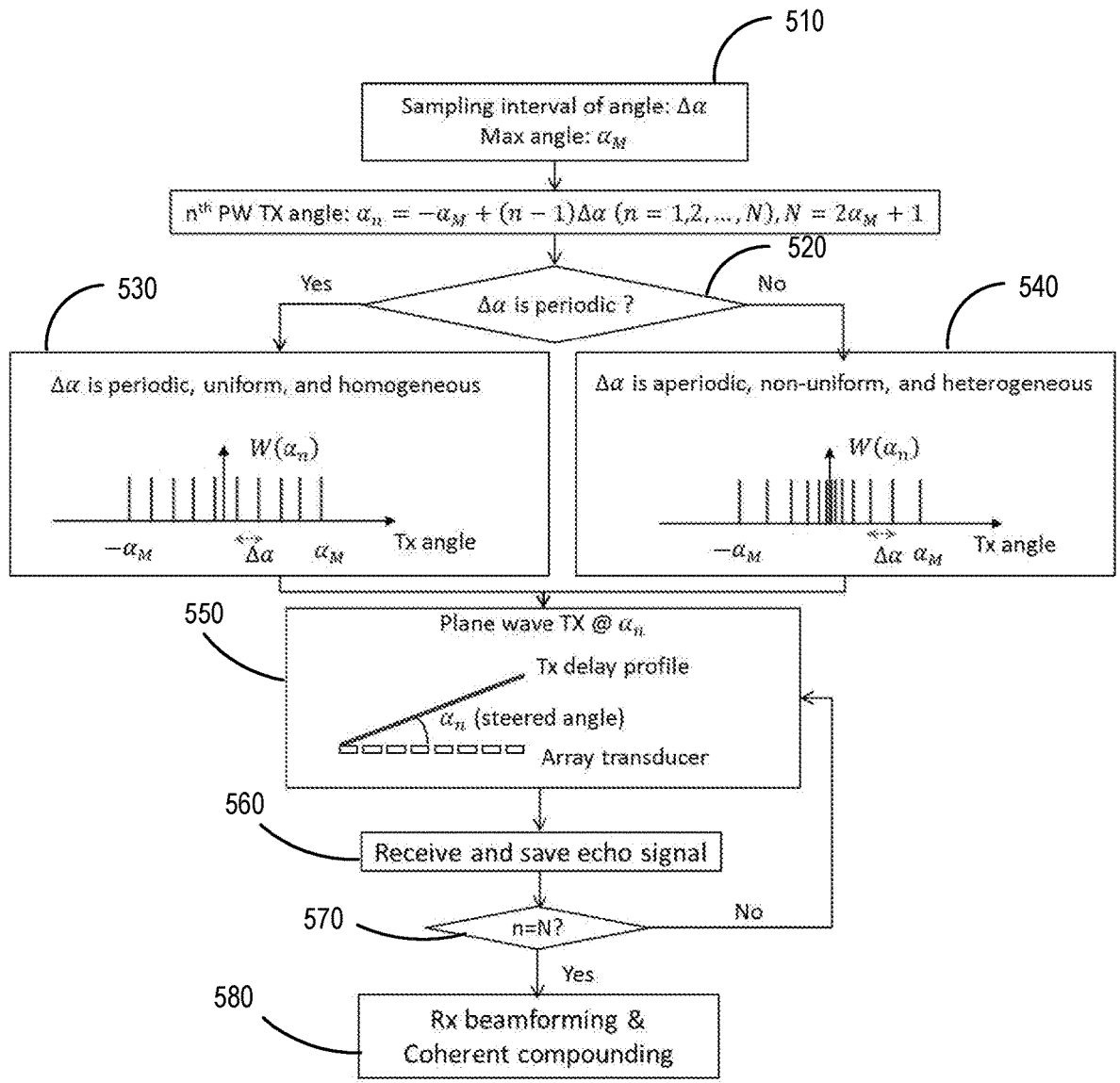
FIG. 5 depicts a non-limiting example flow chart for suppressing side-lobe artifacts using aperiodic sampling angles.

Referring to FIG. 5, a non-limiting example flow chart is provided for suppressing side-lobe artifacts using aperiodic sampling angles. Ultrasound may be transmitted with plane waves generated with steered angle $\alpha_n$, which has a periodic or aperiodic sampling interval. A sampling interval of angle $\Delta\alpha$ is determined at step 510. Whether $\Delta\alpha$ is periodic is assessed at step 520. If $\Delta\alpha$ is periodic, uniform, and homogeneous, then this information is determined at step 530 and fed into a transmission delay profile at step 550. If $\Delta\alpha$ is aperiodic, non-uniform, and heterogeneous, then the variable nature of $\Delta\alpha$ is fed into an optimized transmission delay profile at step 550. The delay profile is adjusted at step 550 for each transmission to create a new steering angle. An echo signal is received and saved at step 560. If the steering angle has reached the maximum angle desired as determined at step 570, then the receive beamforming and coherent compounding is processed at step 580, and may be displayed for a user. If the steering angle has not reached the maximum desired at step 570, then the process may be repeated at step 550.

Figure 6:
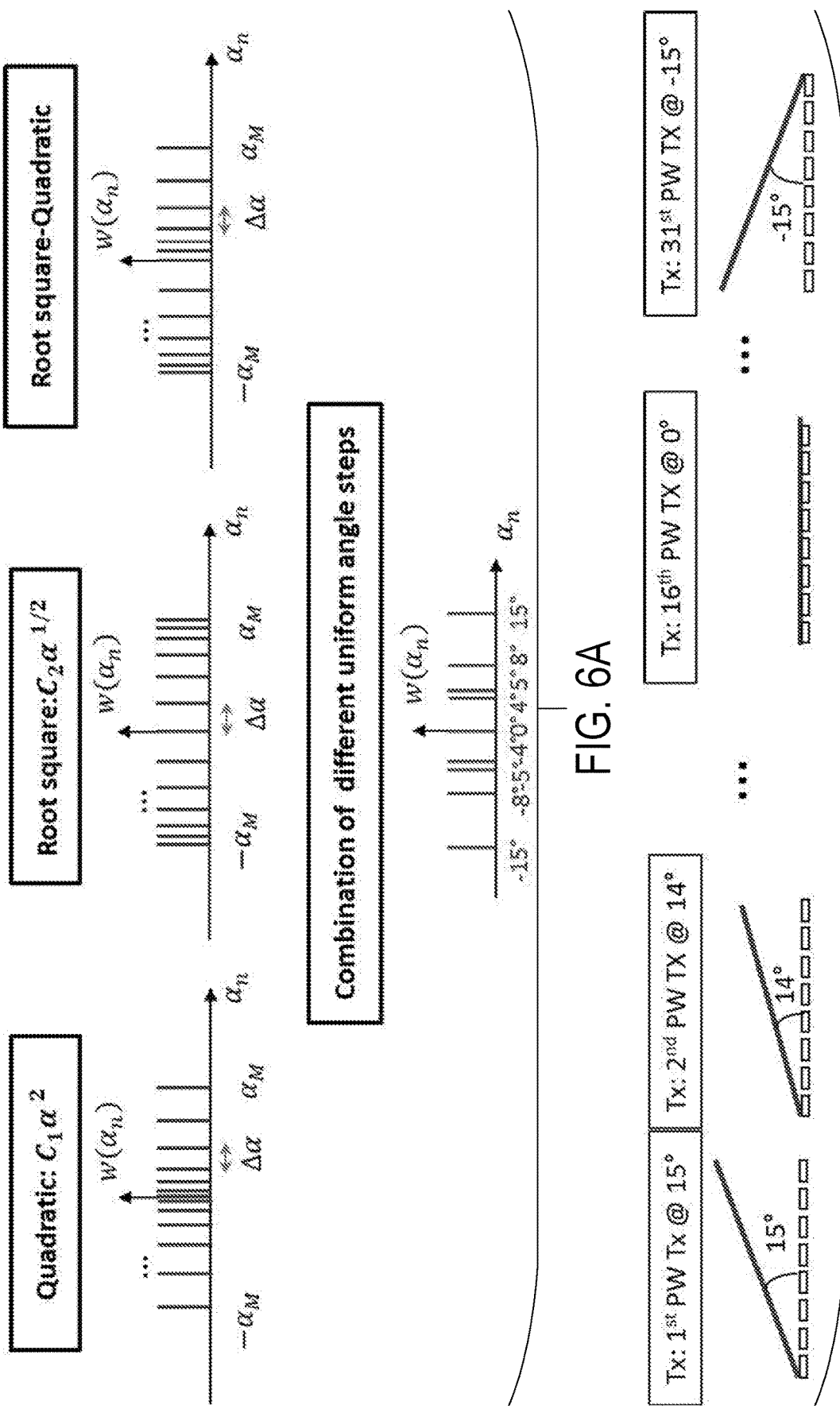
FIG. 6A provides non-limiting examples of sampling interval angles according to FIG. 5.
FIG. 6B provides non-limiting examples of steering angle selections that may be used in a transmission delay profiles in accordance with one configuration of the present disclosure.

In some configurations, this approach may use a heterogeneous sampling interval of angles for the aperiodic sampling angle, such as a random angle or Car from, e.g., quadratic form (r=2) and root-square form (r=0.5) to mitigate the side-lobe artifact. Non-limiting examples of these sampling angles are shown in FIG. 6A. In some configurations the conversion of angle $\alpha$ as =sin $\alpha$ may be used, and in such cases a periodic sampling of angles can produce an aperiodic sampling of. In some configurations, the angle may be small enough to maintain the linearity of sin $\alpha$, where an approximation of sin $\alpha \approx \alpha$ may be used.

Referring to FIG. 6B, non-limiting examples of steering angle selections that may be used in a transmission delay profiles are shown. One skilled in the art will appreciate that other angles are possible and these examples are shown for illustrative purposes.

Figure 7:
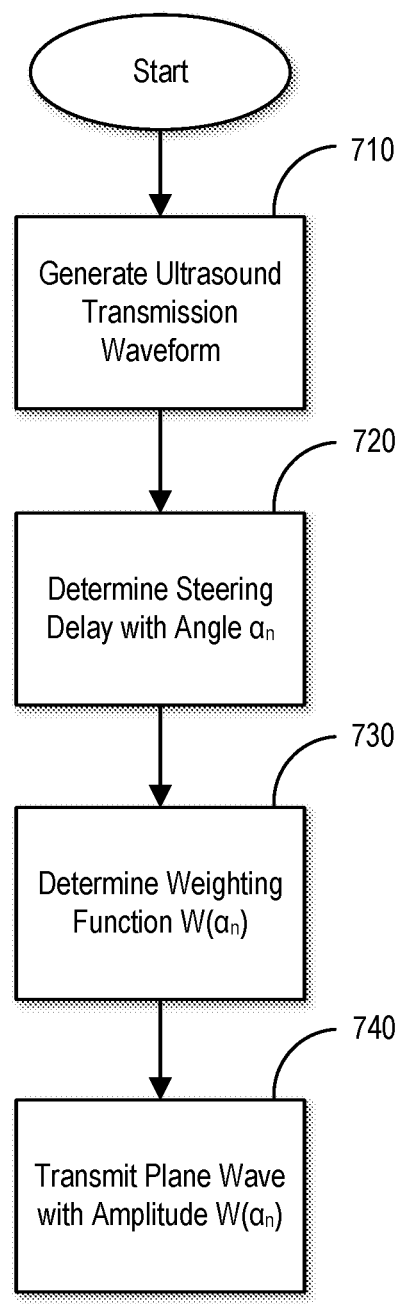
FIG. 7 depicts a non-limiting example flow chart for suppressing side-lobe artifacts using apodization.

Referring to FIG. 7, a non-limiting example flow chart for suppressing side-lobe artifacts using apodization is shown. Apodization may be used to reduce side-lobe levels in a lateral direction by using various window functions. An ultrasound transmission waveform is generated at step 710. A steering delay with angle $\alpha_n$ is determined at step 720. A weighting function $W(\alpha_n)$, such as a rectangular or triangle window, is determined at step 730. A plane wave with amplitude $W(\alpha_n)$ is then transmitted at step 740.

A rectangular window may be used as the standard window function for apodization. In some configurations, array apodization in Tx/Rx aperture utilizing window functions like Hanning, Hamming, Tukey, Gaussian, Kaiser, and so on, may improve the image contrast by suppressing the side-lobes in the lateral direction. The apodization according to different angles in plane wave transmission is also expected to contribute to suppression of the side-lobes of Tx beam pattern. However, the apodization technique may widen the main-lobe width and lower the energy of pulse-echo signals in certain configurations.

Figure 8:
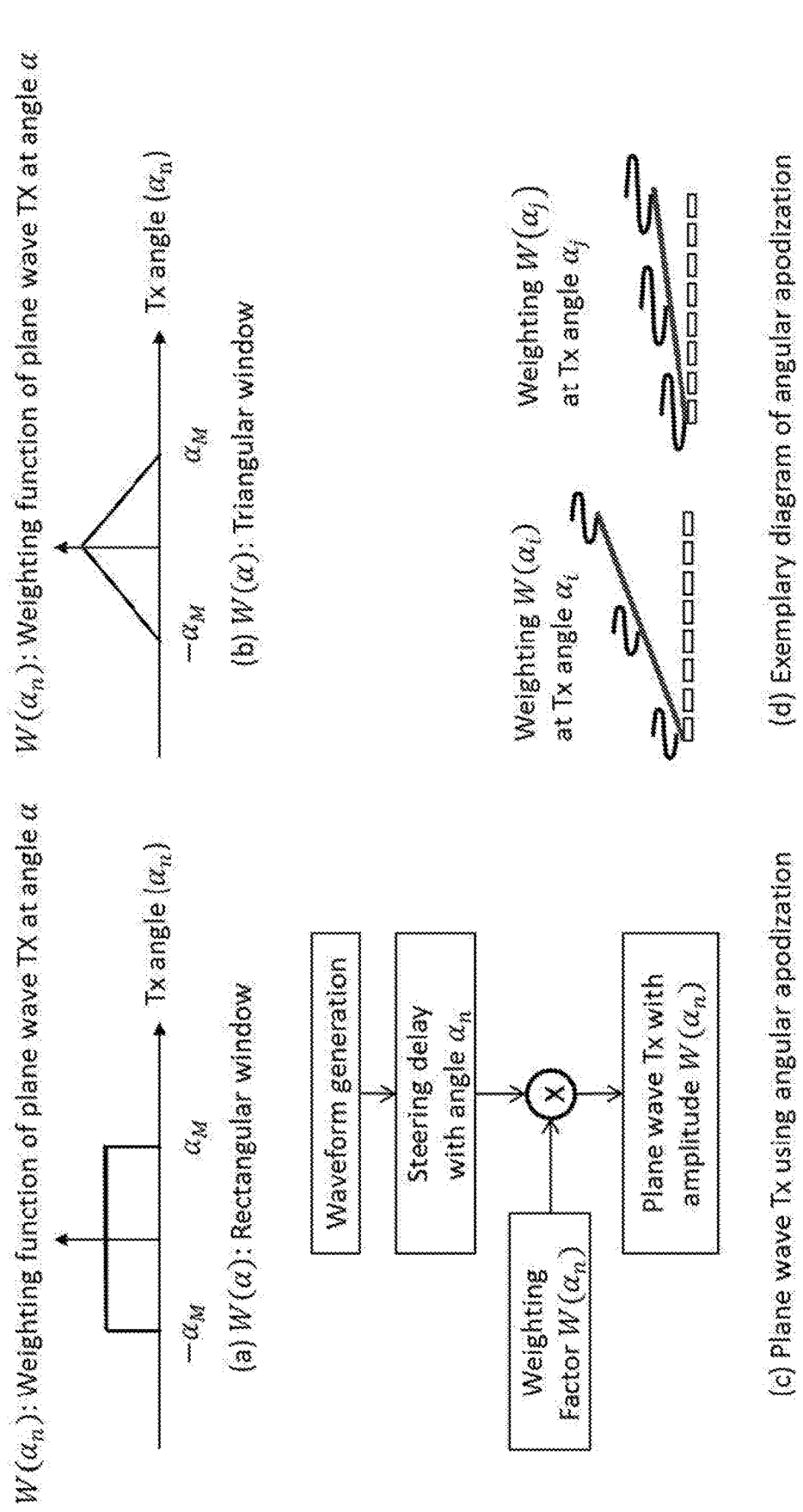
FIG. 8 provides a non-limiting example of angular apodization using a weighting function, $W(\alpha_n)$, according to a steered angle $\alpha_n$.
Figure 9:
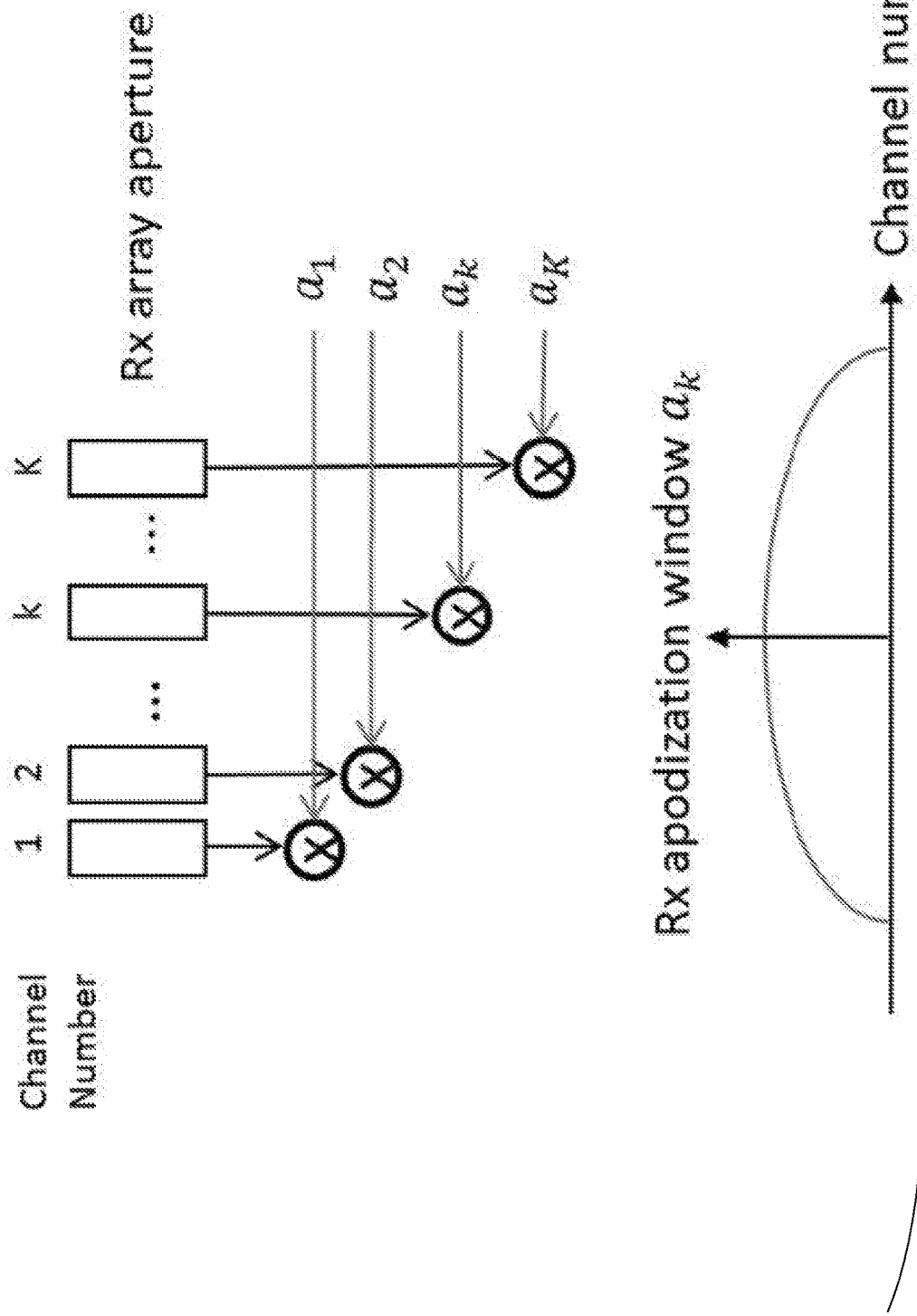
FIG. 9 provides a non-limiting example of a block diagram for Rx aperture apodization using window function $a_k$.

Referring to FIG. 8, a non-limiting example of angular apodization using a weighting (window) function, $W(\alpha_n)$, is shown according to a steered angle $\alpha_n$. Referring to FIG. 9, a non-limiting example of a block diagram for Rx aperture apodization using window function $a_k$ is shown.

Referring to FIGS. 10A-C a typical model of 1-D array transducer with planar and rectangular apertures in space is shown. FIG. 10A depicts a non-limiting example of the diffraction geometry in 3D space for spatial distribution function of source aperture S and field point P, and the geometry in 2D space (x-z) for the beam-pattern analysis of FIG. 10B plane wave Tx and FIG. 10C Rx dynamic focusing. If the height h is chosen properly such that the Fresnel depth expressed as $h^2/\lambda$ is greater than the depth of interest, the lateral field response can be analyzed by the following 2-D wave equation:

$$\left(\frac{\partial^2}{\partial x^2} + \frac{\partial^2}{\partial z^2} - \frac{1}{c^2}\frac{\partial^2}{\partial t^2}\right)\Phi = 0;\quad(3)$$

where c is the wave velocity, t is the time, and $\Phi$ is the velocity potential of wave.

As a simple solution of this equation, a plane wave travelling at an inclined angle $\alpha = \sin^{-1} u$ as in FIG. 10B is given by $$\Phi_u(x,z,t) = e^{-jwt}e^{jkr_p} = e^{-jwt}e^{-jkxu}e^{jkzv} = e^{-jwt}\psi_u(x,z)\quad(4)$$

where k=w/c, w is the angular frequency of the wave, u and v are real numbers satisfying $u^2+v^2=1$, and $\psi_u(x,z)$ is the field pattern of the plane wave transmitted with the steering angle α in an observation point P(x,z). If the plane waves are weighted at different steering angles and coherently compounded at a point $P_c(x_c,z_c)$, the field pattern in an observation point P(x,z) is given by:

$$\psi_{PWC}(x, z) = \int_{-1}^{1} W(u)d(u)\psi_u(x, z)du; \tag{5}$$

where W(u) is an arbitrary complex function of u with a finite range of [−1 1]. To compensate the delay for the coherent compounding at the point $P_c(x_c,z_c)$, d(u) is selected as $$du = = e^{-jkr_c} = e^{jkx_cu}e^{-jkz_cv} \tag{6}.$$

Then, Eqn. (5) that expresses the field pattern coherently compounded with respect to the point $P_c(x_c,z_c)$ in the observation point P(x,z) is given by $$\psi_{PWC}(x, z) = \int_{-1}^{1} W(u)e^{-jk(x-x_c)u}e^{jk(z-z_c)v}d(u) \tag{7}$$

When observing the lateral direction at $z=z_c$, the integration in Eqn. (7) means the beam pattern of PWC is the Fourier transform of the weighting function W(u) that has a non-zero value at an angle $\alpha=\sin^{-1}$ u and can be expressed in terms of a spatial frequency, $f_x=(x-x_c)/\lambda$, i.e., $$\psi_{PWC}(x, z) = \int_{-1}^{1} W(u)e^{-jk(x-x_c)u}d(u) = F[W(u)]_{f_x}. \tag{8}$$

As the plane waves in Eqn. (8) are coherently summed at a compounding point $x=x_c$, $z=z_c$, this point is defined as the retrospective transmit focusing point resulting in the sum of the values of weighting function.

Eqn. (8) at $x_c=0$ represents the Fourier transform of weighting function W(u) with $f_x=x/\lambda$ which provides a simple formation of the beam pattern of PWC. Assuming W(u) is a rectangular window defined in a range of $[-u_m\ u_m]$ with indiscrete angles, i.e., $W(u)=rect(u/2u_m)$ ($u_m=\sin \alpha_m$), Eqn. (8) becomes $$\psi_{PWC}(x, z) = 2u_m \text{sinc}\left(\frac{2u_mx}{\lambda}\right). \tag{9}$$

Thus the lateral field pattern of PWC in the focal plane defined as the x-y plane at $z=z_c$ is given by a sinc function which main-lobe width is $\lambda/(2u_m)$. The main-lobe width and side-lobe level of the lateral beam pattern of PWC will vary according to the weighting function as many previous literatures described. As seen in Eqns. (8) and (9), $\psi_{PWC}(x,z)$ is independent of the depth, z of the observation point at $z=z_c$. This property differentiates the lateral beam pattern of PWC from that of a continuous source with an aperture width of D, which is obtained by the far field approximation and given by $$\phi(x, z) = D\text{sinc}\left(\frac{Dx}{\lambda z}\right). \tag{10}$$

In actual ultrasound systems, a finite number of angles with a sampling interval are used in the coherent compounding technique using plane waves instead an infinite number of continuous angles. Therefore, Eqn. (8) will be expanded to analyze the beam pattern of PWC adopting the sampling of window functions with the finite number of discrete angles.

There are many ways to sample the continuous window and angle. Let us first limit our discussion to a periodic sampling. Then the sampled window function is given by $$W_s(u) = W(u) \sum_{n=0}^{N_T-1} \delta(u - nU_S - u_0); \tag{11}$$

where $U_s$ and $N_T$ are the sampling period (or interval) and the number of samples of u respectively, and $u_0$ is the offset of the samples. Then, substituting Eqn. (11) into Eqn. (8) gives $$\psi_{PWC}(x, z) = \int_{-1}^{1} \sum_{n=0}^{N_T-1} W(u_n)\delta(u - nU_S - u_0)e^{-jk(x-x_c)u}du \tag{12}$$

$$(u_n = \sin\alpha_n);$$

where $W(u_n)=W(nU_s)$, $\alpha_n$ is the n-th inclined angle. For the rectangular window, W(u), Eqn. (12) becomes $$\psi_{PWC}(x, z) = e^{-jk(x-x_c)u_0} \sum_{n=0}^{N_T-1} e^{-jk(x-x_c)nU_S} = \tag{13}$$

$$e^{-jk(x-x_c)\left(\frac{U_S(N_T-1)}{2}+u_0\right)} \frac{\sin\left(\pi N_T U_S \frac{(x-x_c)}{\lambda}\right)}{\sin\left(\pi U_S \frac{(x-x_c)}{\lambda}\right)}.$$

If the compounding point is at the center of array transducer, i.e., $x_c=0$, the lateral beam pattern of PWC becomes $$\psi_{PWC}(x, z) = e^{-jkx\left(\frac{U_S(N_T-1)}{2}+u_0\right)} \frac{\sin\left(\pi N_T U_S \frac{x}{\lambda}\right)}{\sin\left(\pi U_S \frac{x}{\lambda}\right)} \tag{14}$$

This is a periodic sinc function which has a main-lobe width of $\lambda/N_T U_s$ and a period of $\lambda/U_s$. From Eqns. (13) and (14), it can be seen that the sampling interval of u results in repetitive sinc patterns of $l\lambda/U_s$ (l=1, 2, . . . ) increasing the side-lobe level in lateral direction which causes an artifact in ultrasound imaging using coherent plane wave compounding. This artifact appears only depending on the sampling interval of u which is separate from the depth while the grating lobe artifact in lateral direction due to the inter-element spacing of source aperture is directly correlated with the depth. The main lobe width narrows as the maximum angle used in transmitting the plane wave increases. Increasing the number of plane waves which has a periodic sampling interval $U_s$ improves the lateral resolution by minifying the main-lobe width and the side-lobe levels, whereas it degrades the temporal resolution by increasing the number of firings required (NFR).

Here the two-way beam field for plane wave Tx and Rx dynamic focusing is analyzed. Given 1D array aperture in x-z plane, a Rayleigh-Sommerfield scalar wave diffraction formula gives a standard expression of complex field pattern of finite receive aperture from a continuous-wave (CW) radiator as follows.

$$\phi_n = \frac{1}{j\lambda} \int_{-\infty}^{\infty} S_n(x_0) \frac{1}{\sqrt{r}} e^{jkr} dx_0, \quad (15)$$

$$x_0 = x_n + \zeta \left(-\frac{w}{2} \leq \zeta \leq \frac{w}{2}\right),$$

$$x_n = nd + x_{offset}.$$

Eqn. (15) is expressed as by using the binomial approximation given by Eqn. (17) below.

$$\phi_n = \frac{1}{j\lambda\sqrt{r_0}} e^{jkr_0} \int_{-\infty}^{\infty} S_n(x_0) e^{jk\left(\frac{x_0^2 - 2xx_0}{2r_0}\right)} dx_0 = \quad (16)$$

$$C_0 \int_{-\infty}^{\infty} S_n(x_0) e^{jk\left(\frac{x_n^2 + 2x_n\zeta + \zeta^2 - 2xx_n - 2x\zeta}{2r_0}\right)} dx_0 =$$

$$C_0 e^{jk\frac{x_n^2}{2r_0}} e^{-jk\frac{xx_n}{r_0}} \int_{-\frac{w}{2}}^{\frac{w}{2}} e^{jk\frac{\zeta^2}{2r_0}} e^{jk\frac{x_n\zeta}{r_0}} e^{-jk\frac{x\zeta}{r_0}} d\zeta,$$

$$\left(C_0 = \frac{1}{jk\sqrt{r_0}} e^{jkr_0}\right);$$

$$r = \sqrt{(x-x_0)^2 + z^2} = \quad (17)$$

$$\sqrt{(x^2+z^2)\left(1 + \frac{x_0^2 - 2xx_0}{(x^2+z^2)}\right)} \approx r_0 + \frac{x_0^2 - 2xx_0}{2r_0} (r_0 = \sqrt{x^2+z^2}),$$

$$r_f = \sqrt{x_0^2 + z_f^2} \approx z_f + \frac{x_0^2}{2Z_f}.$$

Considering time delay $(r_f - z_f)/c$ at an array element n, Eqn. (16) is given by:

$$\phi_n^{rf} = \frac{1}{j\lambda} \int_{-\infty}^{\infty} S_n(x_0) e^{-jk(r_f - z_f)} \frac{1}{\sqrt{r}} e^{jkr} dx_0 = C_0 e^{-jkx_n^2\left(\frac{1}{2z_f} - \frac{1}{2r_0}\right)} \quad (18)$$

$$e^{-jk\frac{xx_n}{r_0}} \int_{-\frac{w}{2}}^{\frac{w}{2}} e^{-jk\zeta^2\left(\frac{1}{2z_f} - \frac{1}{2r_0}\right)} e^{-jk2x_n\zeta\left(\frac{1}{2z_f} - \frac{1}{2r_0}\right)} e^{-jk\frac{x\zeta}{r_0}} d\zeta =$$

$$C_0 e^{-jkx_n^2\beta} e^{-jk\frac{xx_n}{r_0}} \int_{-\frac{w}{2}}^{\frac{w}{2}} e^{-jk\zeta^2\beta} e^{-jk2x_n\zeta\beta} e^{-jk\frac{x\zeta}{r_0}} d\zeta,$$

$$\left(\beta = \frac{1}{2z_f} - \frac{1}{2r_0}\right).$$

When observing at $r_0 = z_f$, Eqn. (18) is derived as:

$$\phi_n^{rf} = C_0 e^{-jk\frac{xx_n}{r_0}} \int_{-\frac{w}{2}}^{\frac{w}{2}} e^{-jk\frac{x\zeta}{r_0}} d\zeta = C_0 \text{sinc}\left(\frac{xw}{\lambda r_0}\right) \cdot e^{-jk\frac{xx_n}{r_0}}. \quad (19)$$

Thus, the Rx beam field can be determined using the array beamforming assuming the window function, $w_R(n)$ for receive apodization is rectangular window as follows $$\psi_{Rx}(x, z) = \sum_{n=0}^{N_R - 1} w_R(n) \phi_n^{rf} = \quad (20)$$

$$C_0 \text{sinc}\left(\frac{xw}{\lambda r_0}\right) \sum_{n=0}^{N_R - 1} e^{-jk\frac{x}{r_0}(nd + x_{offset})} = C_1 \text{sinc}\left(\frac{wx}{\lambda r_0}\right) \cdot \frac{\sin\left(kd\frac{N_R}{2r_0}x\right)}{\sin\left(kd\frac{1}{2r_0}x\right)}$$

$$\left(C_1 = C_0 e^{-jk\frac{x(N_R - 1)d}{2r_0}} e^{-jk\frac{x}{r_0}(nd + x_{offset})}\right).$$

Finally, the two-way beam field for coherent plane wave compounding and receive dynamic focusing is obtained as:

$$\psi(x, z) = \psi_{PWC}(x, z) \cdot \psi_{Rx}(x, z) = \quad (21)$$

$$C_2 \text{sinc}\left(\frac{wx}{\lambda r_0}\right) \cdot \frac{\sin\left(\frac{\pi N_T U_S}{\lambda}x\right)}{\sin\left(\frac{\pi U_S}{\lambda}x\right)} \cdot \frac{\sin\left(\frac{\pi d N_R}{\lambda r_0}x\right)}{\sin\left(\frac{\pi d}{\lambda r_0}x\right)},$$

$$\left(C_2 = C_1 e^{-jkx\left(\frac{U_S(N_T - 1)}{2} + u_0\right)}\right).$$

The present disclosure has described one or more preferred embodiments, and it should be appreciated that many equivalents, alternatives, variations, and modifications, aside from those expressly stated, are possible and within the scope of the invention.

The invention claimed is:

1. A method for image artifact suppression in ultrasound imaging comprising:
   a) transmitting an ultrasound beam to a subject using an ultrasound transducer;
   b) determining an ultrasound transmission beam pattern from the transmitted beam, wherein the transmission beam pattern is measured from the transmitted ultrasound beam, and wherein determining the ultrasound transmission beam pattern comprises identifying a plurality of peaks in the measured transmitted ultrasound beam as a function of lateral position on the ultrasound transducer;
   c) receiving an ultrasound beam from the subject and determining a received ultrasound beam pattern, wherein the received ultrasound beam pattern is measured from the received ultrasound beam, and wherein determining the received ultrasound beam pattern comprises identifying a plurality of null points in the received ultrasound beam pattern as a function of lateral position on the ultrasound transducer;
   d) suppressing image artifacts by adjusting an F-number of the ultrasound transducer such that the plurality of null points in the received ultrasound beam pattern are positioned at the plurality of peaks in the transmission beam pattern.

2. The method of claim 1 further comprising determining the F-number based upon a sampling interval.

3. The method of claim 2 wherein the F-number is determined by $$F_{mum} = \frac{l}{mU_s} \approx \frac{l}{m\Delta\alpha} (l, m = 1, 2, \ldots)$$

where $U_s$ represents a sampling period interval of u, which is a real number, $\Delta\alpha$ represents a sampling interval angle, and l and m are integers.

4. The method of claim 1 further comprising repeating steps (a)-(d) for a wider field of view without increasing a number of firings.

5. The method of claim 1 wherein the transmission beam pattern is determined based on a heterogeneous sampling interval of steering angles.

6. The method of claim 5 wherein the heterogeneous sampling interval comprises an aperiodic sampling interval.

7. The method of claim 6 wherein the aperiodic sampling interval is based on at least one of a quadratic function, a root square function, a root square-quadratic function, or a combination thereof.

8. The method of claim 1 wherein side-lobe artifacts are further reduced by applying an angular apodization to transmission steering angles.

9. The method of claim 8 wherein the angular apodization is performed by applying a weighting function to the transmission steering angles.

10. The method of claim 1 wherein side-lobe artifacts are further reduced by applying a receive aperture apodization.

11. The method of claim 10 wherein the receive aperture apodization is performed by applying a weighting function to receive channels as a function of channel number.

12. A method for image artifact suppression in ultrasound imaging comprising:
  a) determining an aperiodic sampling angle interval;
  b) generating a non-uniform angular distribution of steering angles for a plane wave ultrasound transmission using the aperiodic sampling angle interval;
  c) determining a transmission delay profile for channels of an ultrasound transducer based upon a first steering angle selected from the non-uniform angular distribution of steering angles;
  d) transmitting a first plane wave of ultrasound to a subject using the transmission delay profile;
  e) receiving an ultrasound signal from the subject;
  f) suppressing side-lobe image artifacts by updating the transmission delay profile with a second steering angle selected from the non-uniform angular distribution of steering angles based upon the aperiodic sampling angle interval and transmitting a second plane wave of ultrasound to the subject using the updated transmission delay profile, wherein the updated transmission delay profile defines a transmission beam pattern comprising a plurality of peaks as a function of lateral position on the ultrasound transducer;
  g) adjusting an F-number of the ultrasound transducer based on the aperiodic sampling angle interval to further suppress side-lobe levels in the transmission beam pattern by positioning a plurality of null points in a received ultrasound beam pattern at the plurality of peaks in the transmission beam pattern, wherein the received ultrasound beam pattern is measured from the received ultrasound signal by identifying a plurality of null points in the received ultrasound signal as a function of lateral position on the ultrasound transducer.

13. The method of claim 12 further comprising updating the transmission delay profile with a plurality of steering angles based upon the aperiodic sampling angle interval.

14. The method of claim 13 further comprising repeatedly updating the transmission delay profile and transmitting ultrasound to the subject until a maximum steering angle is reached.

15. The method of claim 14 wherein the aperiodic sampling angle interval is based on a function that defines a distribution of sampling angles.

16. The method of claim 14 wherein the function is at least one of a quadratic function, a root square function, a root square-quadratic function, or a combination thereof.

17. The method of claim 14 wherein the aperiodic sampling angle interval comprises a combination of different uniform angle steps.

18. The method of claim 12 wherein side-lobe artifacts are further reduced by applying an angular apodization to transmission steering angles.

19. The method of claim 18 wherein the angular apodization is performed by applying a weighting function to the transmission steering angles.

20. The method of claim 12 wherein side-lobe artifacts are further reduced by applying a receive aperture apodization.

21. The method of claim 20 wherein the receive aperture apodization is performed by applying a weighting function to receive channels as a function of channel number.

* * * * *